(12) United States Patent
Su

(10) Patent No.: US 7,513,481 B2
(45) Date of Patent: Apr. 7, 2009

(54) ONE WAY VALVE

(76) Inventor: Fu-Long Su, P.O. Box 166-13, Taipei, Taiwan (TW) 115

( * ) Notice: Subject to any disclaimer, the term of this patent is extended or adjusted under 35 U.S.C. 154(b) by 271 days.

(21) Appl. No.: 11/260,364

(22) Filed: Oct. 28, 2005

(65) Prior Publication Data

US 2007/0095403 A1 May 3, 2007

(51) Int. Cl.
 *F16K 15/20* (2006.01)
(52) U.S. Cl. .................... 251/82; 206/524.8
(58) Field of Classification Search ............ 137/512.15; 251/82; 206/524.8
 See application file for complete search history.

(56) References Cited

U.S. PATENT DOCUMENTS

| | | | | |
|---|---|---|---|---|
| 2,404,020 A | * | 7/1946 | Akerman | 128/202.11 |
| 2,506,306 A | * | 5/1950 | Mantle | 137/516.15 |
| 3,217,736 A | * | 11/1965 | Waldemar | 137/343 |
| 3,860,133 A | * | 1/1975 | Boxer et al. | 215/206 |
| 3,973,588 A | * | 8/1976 | Holst | 137/854 |
| 4,229,832 A | * | 10/1980 | Dickson, Sr. | 137/81.2 |
| 4,518,014 A | * | 5/1985 | McAlpine | 137/843 |
| 4,579,147 A | * | 4/1986 | Davies et al. | 137/854 |
| 4,762,145 A | * | 8/1988 | Stradella | 137/599.18 |
| 4,893,644 A | * | 1/1990 | Giacomini | 137/218 |
| 5,141,024 A | * | 8/1992 | Hicks | 137/530 |
| 5,169,003 A | * | 12/1992 | Traupman | 206/524.8 |
| 5,332,095 A | * | 7/1994 | Wu | 206/524.8 |
| 5,450,963 A |   | 9/1995 | Carson | |
| 5,480,030 A | * | 1/1996 | Sweeney et al. | 206/524.8 |
| 5,735,395 A | * | 4/1998 | Lo | 206/278 |
| 5,931,189 A |   | 8/1999 | Sweeny et al. | |
| 5,940,878 A | * | 8/1999 | Hattori et al. | 2/2.15 |
| 5,954,196 A | * | 9/1999 | Lin | 206/286 |
| 6,029,810 A | * | 2/2000 | Chen | 206/287 |
| 6,408,872 B1 |   | 6/2002 | Skeens et al. | |
| 6,604,634 B2 | * | 8/2003 | Su | 206/524.8 |
| 6,644,510 B2 | * | 11/2003 | Kawolics et al. | 222/105 |
| 6,732,875 B2 | * | 5/2004 | Smith et al. | 220/253 |
| 7,278,445 B2 | * | 10/2007 | Marvin et al. | 137/601.2 |
| 2006/0118744 A1 | * | 6/2006 | Tang | 251/82 |
| 2006/0197042 A1 | * | 9/2006 | Kneer | 251/82 |
| 2008/0017818 A1 | * | 1/2008 | Tang | 251/82 |

* cited by examiner

*Primary Examiner*—John Rivell
*Assistant Examiner*—William McCalister

(57) ABSTRACT

The present invention is to provide one-way valve of a sealed bag to expel the dead air out from the bag with a preferred air-tight effect. The one-way valve comprises a valve seat, a diaphragm mounted inside the valve seat, the diaphragm is also in linear contact with a projected annular ring, a stop device pressed on the diaphragm, a valve cap screwed to the valve seat and pressed the stop device. Said valve cap has hooks adapted to apertures of the seat, thus keep the cap on the seat not to be separated from thereof. Moving upward or downward the valve cap, the stop device can be controlled to press onto the diaphragm tightly or become loose. An airtight effect is achieved with a pressure exerted between the stop device and the annular ring. Or one-way valve can expel the dead air through the air pores under diaphragm.

6 Claims, 9 Drawing Sheets

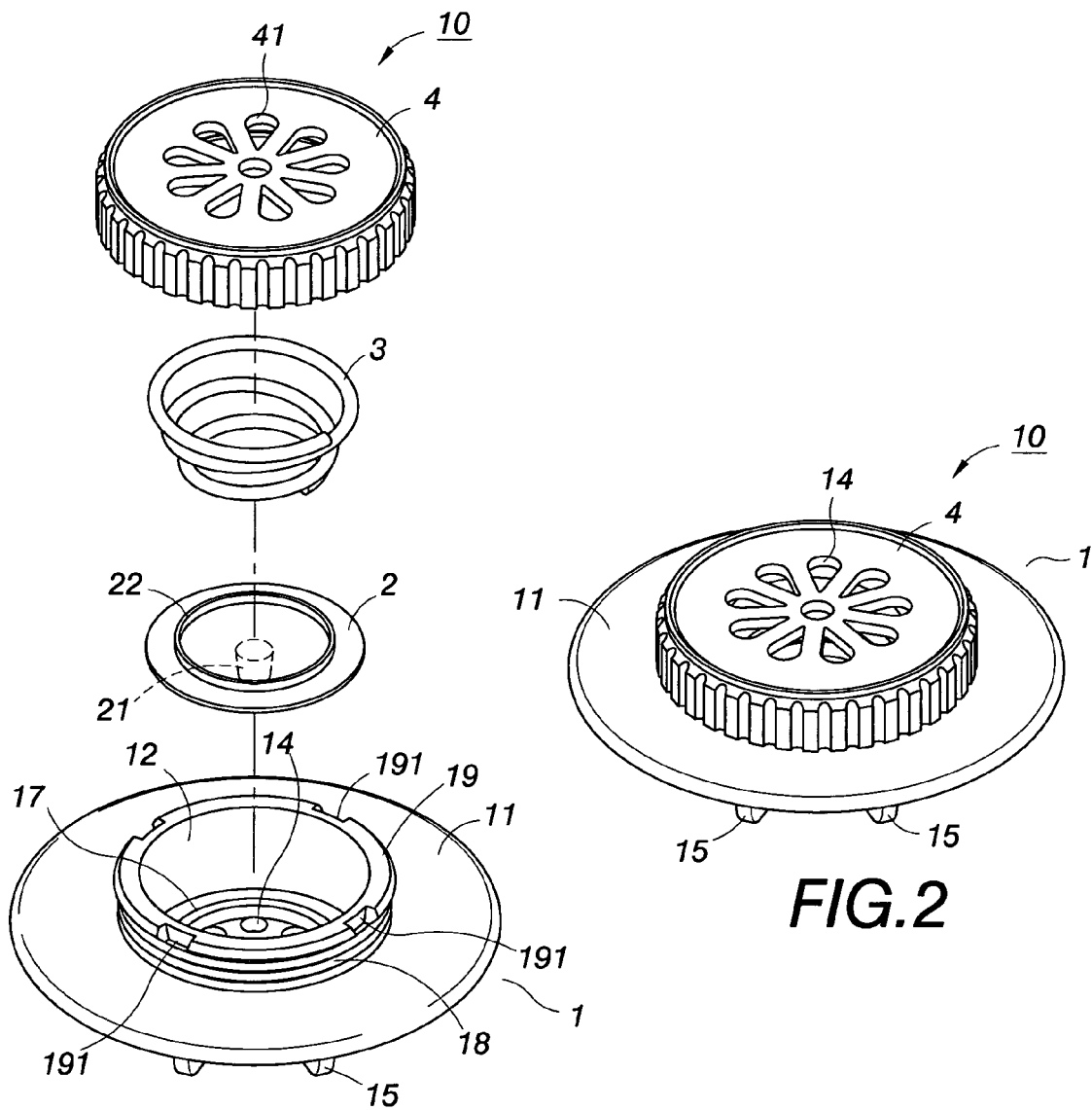

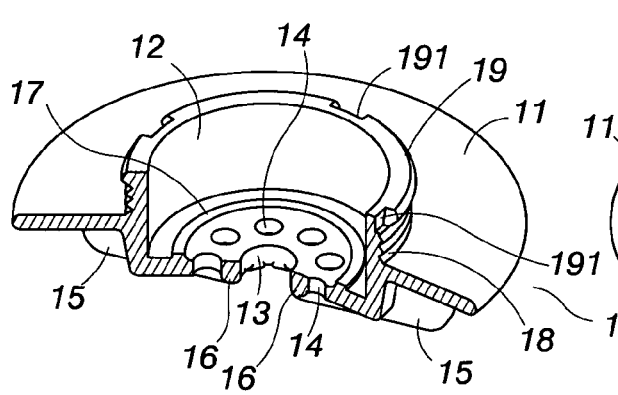
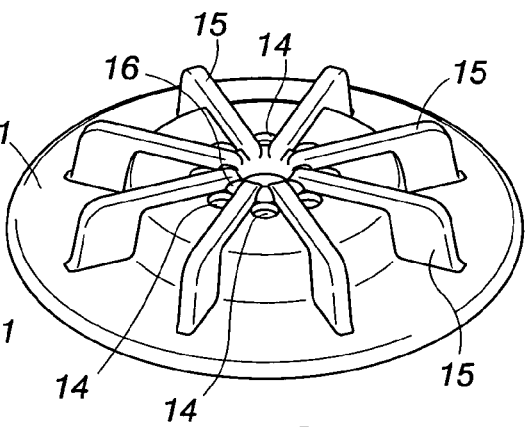
FIG.3    FIG.4
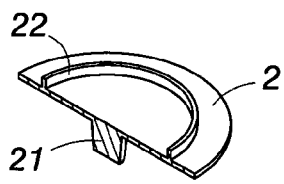
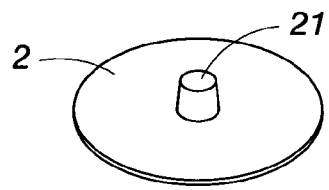
FIG.5    FIG.6
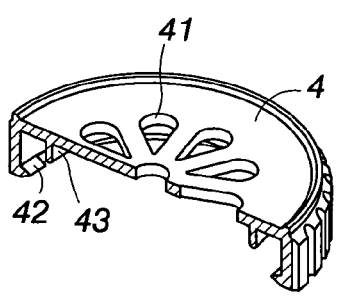
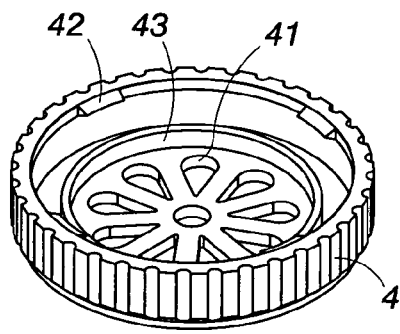
FIG.7    FIG.8

ONE WAY VALVE

FIELD OF THE INVENTION

The present invention is related to one-way valve of a sealed receiving bag. By means of an atmospheric pressure, it expels the dead air out of the bag without flowing back, also being suitable for preventing the fluid from flowing back thereto.

BACKGROUND OF THE INVENTION

Vacuum cleaners applied to expel the air from sealed bag, may reduce the bulky, fluffy volume of the received objects. Being a well-known technique to store the objects, such as clothes, quilts, occupied space can be reduced so as to inhibit bacteria growth. In practice, a valve is applied to expel the dead air from the bag without flowing back thereto. Thus one-way valve plays a role when using a sealed bag for receiving objects. About the structure of one-way valve, we can see five US patent documents about the one way valve as following: 1. U.S. Pat. No. 6,604,634 entitled "receiving bag with enhanced airtight effect" issued to the inventor of the present invention Fu-Long Su on 12 Aug. 2003. 2. U.S. Pat. No. 5,931,189 entitled "one way valve for use with vacuum cleaner attachment" issued to Sweeny et al. on 3 Aug. 1999. 3. U.S. Pat. No. 5,480,030 entitled "reusable, evacuable enclosure for storage of clothing and the like" issued to Sweeny et al. on 2 Jan. 1996. 4. U.S. Pat. No. 5,450,963 entitled "air removal device for sealed storage container" issued to James A. Carson on 19 Sep. 1995. 5. U.S. Pat. No. 6,408,872 entitled "evacuable container one-way valve with filter element" issued to Skeens et al. on 25 Jun. 2002.

Aforesaid one-way valve of prior arts has some drawbacks as following:

1. One-way valve of U.S. Pat. No. 6,604,634 is manufactured through a more complex process to form a valve, which is also cost-inefficient.

2. U.S. Pat. Nos. 6,604,634, 5,931,189, and 5,480,030 show a valve seat is covered by a cap, before expelling air from the bag, the cap must be removed from the valve seat. After expelling air, the cap is re-capped over the valve seat. In practice the separated cap is easily to lose. Further, the procedures of frequently removing and re-capping of the cap to the valve seat are also inconvenient for the users.

3. Aforesaid cap is capped over the valve seat projected out from the sealed bag. As the sealed bags are in the process of moving, stacking or storing, the caps are easily to drop, to lift by forces of impacting or pressing.

4. Aforesaid sealed bag is full of air, and the cap is screwed thereon. As an outer force is exerted to the bag, the bag is compressed, an air pressure is instantly and automatically increased in the bag, which is greater than a tension dynamically maintained by the closure between the cap and the valve seat, the closure will eject the cap to pop out.

5. Aforesaid valve seat has diaphragm made of elastic film. Supposed the cap is impacted or compressed by an outer force or a heavy stamping, because there has no instrument can be applied to buffer and fit the cap and diaphragm in position, so the diaphragm endured a larger force is pushed to move out of its location; the sealed mechanism of the diaphragm is therefore affected to minimize, to eliminate.

6. Aforesaid U.S. Pat. Nos. 6,604,634, 5,931,189, 5,480,030, 5,450,963, and 6,408,872, the diaphragm is made of silica gel or rubber, they are influenced by the density-dependent factors such as to expand when hot and to shrink when cold, especially a bit of shrinkage in the frigid zone, results in incomplete closure of the air pore or vent hole, the expelled air can be flowed back.

7. Aforesaid U.S. Pat. Nos. 5,450,963, and 6,408,872 has no cap over the valve seat, though it aims to simplify the structure of the valve, a little deformation or damage happened to the diaphragm results in incomplete closure of the air pore or vent hole; and then the expelled air is flowing back. Let alone the diaphragm has a limited endurance test duration in unison with the elastic valve, and the density dependent factors such as to expand when hot and to shrink when cold affect the same diaphragm. Without a cap to adjust the pressure exerted to the diaphragm, the mechanism of the valve is still imperfect.

SUMMARY OF THE INVENTION

Point against aforesaid drawbacks, the present invention provides one-way valve of the sealed bag as claim 1 claimed comprising: a valve seat (1) having a valve trough (12) with an opening at a first end, a plate (11) extends radially outwardly from the valve trough (12) combined to the sealed bag, a base formed at a second end has a central alignment hole (13), which is surrounded by a plurality of air pores (14), further the air pores are circumscribed by an annular projected ring (17), outer threads (18) formed along a rim of the valve trough (12) above the plate (11), a stop ring (19) on top of the outer threads (18) has an outer diameter larger than the outer threads (18) with several apertures (191) formed equidistantly along an outer rim of the stop ring (19); a diaphragm (2), which is a flexible film mounted inside the valve trough (12) with a bolt (21) embedded into the central alignment hole (13) of the base of the valve trough; a stop device (5) having a first end props up a valve cap (4), a second end resists against the diaphragm (2), the stop device (5) is further corresponding to the annular projected ring (17) of the base of the valve trough (12); the valve cap (4) screwed to the outer threads (18) of the valve seat (1), a plurality of air pores (41) formed through a top of the cap (4), several hooks (42) radially inwardly formed along a bottom rim of the cap (4), the hooks (42) are corresponding to and guided into the apertures (191) of the stop ring (19), and then screwed to the outer threads (18) of the valve seat (1).

Provided one-way valve as claim 2 claimed a valve trough (12) of the valve seat (1) and the plate (11) has an underside with a plurality of air deflectors (15) formed around the alignment hole (13) distributed in radial symmetry.

One-way valve as claim 3 claimed a projected annular ring (16) formed below the alignment hole (13) connected to the air deflectors (15), the height of the annular ring (16) is lower than the air deflectors (15).

One-way valve as claim 4 claimed a projected annular ring (22) formed on top of the diaphragm (2) in an annular form for the stop device (5) to fit over.

One-way valve as claim 5 claimed a projected annular ring (43) formed underneath the cap (4) for the stop device (5) to fit over.

One-way valve as claim 6 claimed the hooks (42) has inner threads formed radially inwardly, the inner threads can be applied to screw to the outer threads (18) of the valve trough (12), a radial depth of the inner threads is deeper than the depth of the apertures (191).

One-way valve as claim 7 claimed the stop device (3) is a buffer spring.

One-way valve as claim 8 claimed the stop device (5) is a transparent compressed seat having a truncated pipe (50), the outer diameter of the pipe is smaller than the inner diameter of the valve trough (12), an annular lip (51) is extended radially outwardly along a rim of a top opening of the pipe (50), a crossed and enforced rib (53) formed inside a bottom opening, a plurality of hollowed troughs (52) are arranged around a circumference of the truncated pipe (50).

One-way valve as claim 9 claimed two different colored signs (192, 193) marked on a top of the stop ring (19) of the valve seat (1), a top of the valve cap (4) has a through hole (44) corresponding to the different two signs (192,193).

EFFECTS OF THE PRESENT INVENTION IN CONTRAST TO THE PRIOR ARTS

In practice, the present invention can achieve the advantages as following:

1. Cap (4) is screwed to the valve seat (1) up and down, which is applied to control the pressure exerted to the diaphragm tightly or loose. For example, when the cap (4) is lowered, the stop device (5) presses on the diaphragm (2), a preferred sealed effect is generated between the diaphragm (2) and the annular projected ring (17). Conversely, when the cap (4) is heightened, the stop device (5) is relieved from a process of increasing pressure so as to move upward the stop devices (5) afloat together with the diaphragm (2) in the air-expelled process, and the air pores (14) are opened to expel the dead air out from the bag, when the air-expelled process is discontinued, an atmospheric pressure is applied to restore the spring (3) and the diaphragm (2), the air pores are sealed to prevent the expelled air from flowing back. One-way mechanism is realized in practice.

2. An annular ring (17) formed on the base of the valve trough 12 is in linear contact with the underside of the diaphragm (2), the stop device (5) also presses on the diaphragm (2), and the stop device is corresponding to the annular ring (17); though the diaphragm (2) is pressed for a long period of time, a preferred air-tight effect is kept.

3. The diaphragm (2) being a soft film provides airtight mechanism with the annular ring (17) of the valve trough (12) under the pressure of the stop device (5). It is not affected by the density dependent factors such as to expand when hot to shrink when cold. While the diaphragm (2) is afloat in the process of air-expelled, but the blot (21) kept in the alignment hole (13) of the valve trough (12) without moving the diaphragm (2).

4. Through the easy implementation, above mentioned the four components such as the diaphragm (2), the stop device (5), the valve seat (1), and the cap (4) can be combined as a whole integrally, the diaphragm (2) and the stop devices (5) can be disposed into the valve trough (12) of the valve seat (1) and sealed by the valve cap (4) promptly.

5. Four components of the configuration structure are simple, easy to produce, and cost-efficient.

Aforesaid valve trough (12) and the plate (11) of the valve seat (1) have an underside with air deflectors (15) distributed in radial symmetry, the air deflectors (15) can be used to hinder a lower portion of the sealed bag fallen under the valve trough (12) from cohering together inside the air pores (14) throughout the air-expelled or air-filled performances. Otherwise, when air-expelled in the sealed bag, the fallen lower bag portion may be absorbed and intruded into the air pores, the performance comes to a halt.

Projected annular ring (16) formed below the alignment hole (13) of aforesaid valve trough (12) is in connection with the air deflectors (15), the height of the annular ring (16) is lower than the air deflectors (15) to keep the alignment hole (15) from intruding by fallen portion of the sealed bag.

Projected annular ring (22) on top of the diaphragm (2) can fit in the spring (3), and then the spring (3) is to prop against the diaphragm (2), the diaphragm (2) is hardly out of place or dislocated.

Projected annular ring (43) formed underneath the valve cap (4), the spring (3) can fit over the annular ring (43) and then the spring (3) is to prop up the valve cap (4), the spring (3) is hardly out of place or dislocated.

Hooks (42) projected from the inner rim of the cap (4) radially inwardly have a depth deeper than the apertures (191) of the stop ring (19), when the hooks (42) are forced to lead into the apertures (191), but the hooks (42) hardly be withdrawn thereof in reverse direction. Even the cap (4) is released, the hook (42) hardly drop off the aperture (191).

Stop device (3) is a buffer spring, which can exert a larger elastic force to the diaphragm (2) to achieve a preferred airtight effect.

Stop device (5) is a transparent compressed seat, as the cap (4) is released to move upward, a bigger gap is generated between the valve seat (1) and the stop ring (19), but the gap can be mended by the truncated pipe (50) and the annular lip (51). So when the air-expelled pipe (103) is implemented in a process of inducing surrounding air, the dead air of the sealed bag (100) can be flowed or circulated throughout the one-way valve (10). Even in the air-expelled process, air flowed or circulated into the through hole (44) of cap (4) is hardly absorbed into the bag.

Two different colored signs (192, 193) marked on a top of the stop ring (19) of valve seat (1) correspond to the through hole (44) formed through a top of the cap (4), the user does know an open or close status from the colored signs (192) or (193) appeared in the through hole (44) of the one-way valve (10) at a first sight.

BRIEF DESCRIPTION OF THE DRAWINGS

FIG. 1 is an exploded perspective view of the first embodiment of the present invention;

FIG. 2 is an assembled view of the one-way valve;

FIG. 3 is a top view of the valve seat;

FIG. 4 is a bottom view of the valve seat;

FIG. 5 is a sectional top view of the diaphragm in FIG. 1;

FIG. 6 is a bottom view of the diaphragm in FIG. 1;

FIG. 7 is a sectional view of the valve cap in FIG. 1;

FIG. 8 is a bottom view of the valve cap in FIG. 1;

DETAILED DESCRIPTION OF THE PREFERRED EMBODIMENTS

Figure 9:
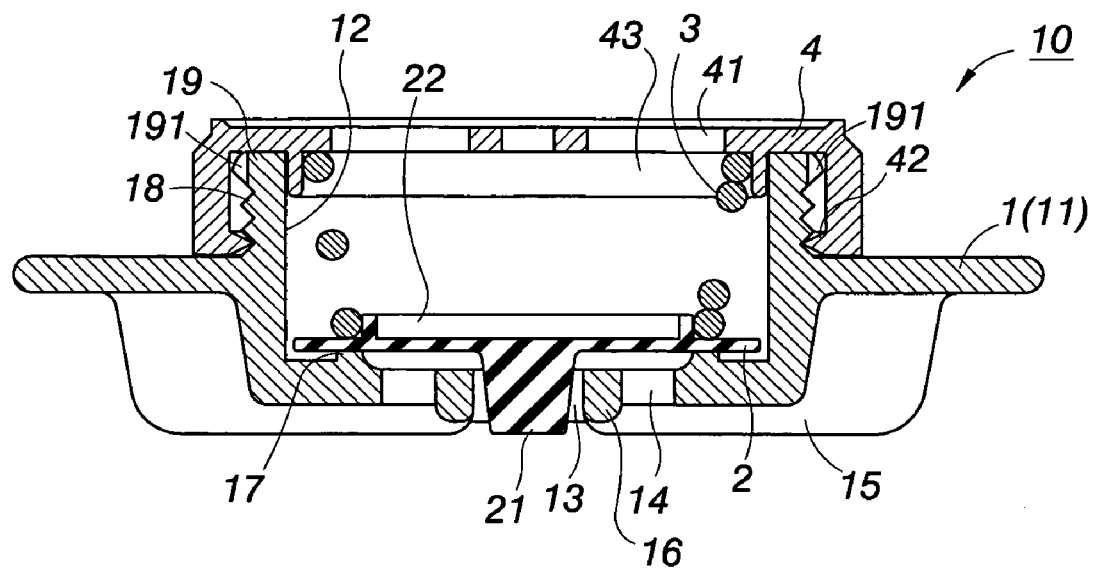
FIG. 9 is a cross sectional view of the first embodiment of the one-way valve.

The description is described in conjunction with the appended drawings as following:

First Embodiment

Referring to FIG. 1, an exploded view of the first embodiment of the present invention is illustrated. One-way valve (10) comprises a valve seat (1), a diaphragm (2) mounted inside the valve seat, the diaphragm (2) is in linear contact with a projected annular ring (17), a stop device (3) props against the diaphragm (2), a valve cap (4) screwed to the valve seat covers over a buffer spring (3). After combination, an assembled view is illustrated as shown in FIG. 2.

Aforesaid valve seat (1), whose structure is illustrated in FIGS. 3 and 4. Valve seat (1) has a valve trough (12) with an opening formed at a first end, a plate (11) extended radially outwardly from a circumference of the opening and secured to a sealed bag, a base having a central alignment hole (13) formed at a second end of the valve trough (12), the central alignment hole (13) is surrounded by a plurality of air pores (14) and a projected annular ring (17). The valve trough (12) has outer threads (18) formed around a circumference surface above the plate (11). A stop ring (19) formed on top of the outer threads (18), has an outer diameter greater than the outer threads. The stop ring (19) has several apertures (191) formed along a circumference equidistantly. Further, a plurality of air deflectors (15) distributed in radial symmetry around the central alignment hole (13) formed through the base of the valve trough (12). A projected annular ring (16) underneath the alignment hole is in contact with the air deflectors (15). Height of the annular ring (16) is lower than the air deflectors (15).

Structure of the diaphragm (2) is illustrated as shown in FIGS. 5 and 6. The diaphragm is made of flexible, soft plastics, a bolt (21) projected downward at a center of an underside of the diaphragm (2) can be embedded into the alignment hole (13) of the base of the valve trough (12). (Please Refer to FIG. 9)

Aforesaid stop device (3) is a spring, a first end of the spring props up the valve cap (4), a second end of the spring resists against the diaphragm and corresponding to an elastic buffer device on the projected annular ring (17) (Please refer to FIG. 9) of the base of the valve trough (12).

Structure of the valve cap (4) is illustrated as shown in FIGS. 7 and 8. A plurality of air pores (41) formed through a top of the valve cap (4), and several hooks (42) formed inside a bottom rim of the valve cap (4) projected inwardly are corresponding to the apertures (191) of the stop ring (19) of the aforesaid valve seat (1). As the hooks (42) are led in the apertures (191) in axial direction, by means of the inner threads formed along the hooks (42) screwed to the outer threads (18), the valve cap (4) moved upward or downward on the valve seat (1). And the hooks (42) can be glide into the apertures but hardly retracts out in reverse direction.

Referring to FIG. 9, after combination, an interconnection relationship among the valve seat (1), diaphragm (2), stop device (3) and valve cap (4) is illustrated. The diaphragm (2) mounted inside the valve trough (12) with a bolt (21) projected downward from the underside thereof is fit into the alignment hole (13) of the base of the valve trough (12) in position. The underside of the diaphragm (2) is in linear contact with the projected annular ring (17) of the base. Hooks (42) of the valve cap (4) are adapted to the outer threads (18) of the valve seat 1 tightly by screwing. After the valve cap (4) is screwed to the valve seat (1), the stop device (3) is confined and compressed between the valve cap (4) and the diaphragm (2). A projected annular ring (43) underneath the valve cap (4) fits in the stop device (3); moreover, the stop device (3) fits over a projected annular ring (22) on a top of the diaphragm (2). A preferred positioning effect is achieved among the valve cap (4), stop device (3) and the diaphragm (2). A bottom end of the stop device (3) is corresponding to the projected annular ring (17) on the base of the valve trough (12). Therefore, a pressure exerted to the diaphragm (2) by the stop device (3) can achieve a preferred airtight effect.

Figure 10:
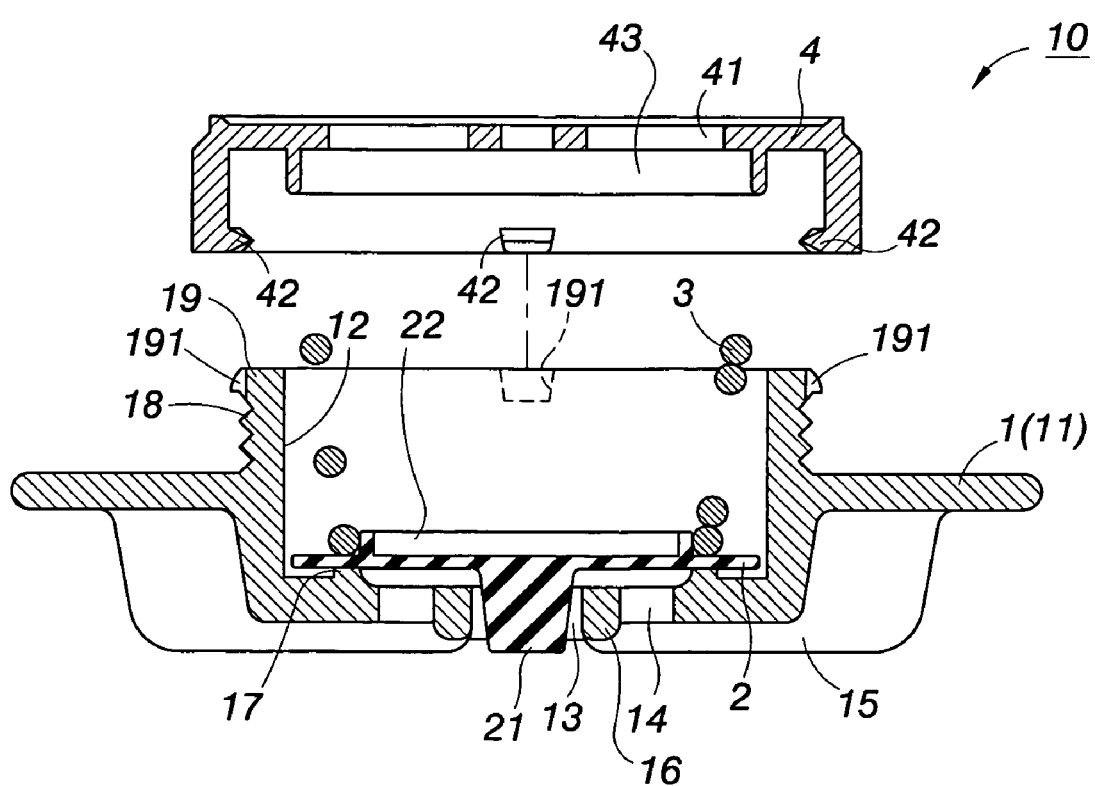
FIG. 10 is a cross sectional view before valve cap combined to the valve seat of the first embodiment.

Referring to FIG. 10, before the valve cap (4) is screwed to the valve seat (1), the hooks (42) are aligned with the apertures (191) of the stop ring (19) and then the valve cap (4) can be led in position to cover over the valve seat (1). Due to the radial depth of the hooks (42) is deeper than the apertures (191) of aforesaid stop ring (19), the hooks (42) led into the apertures (191) is hardly to retract back in reverse direction. Even the valve cap (4) is released on the valve seat (1), the valve cap (4) is still kept on the valve seat (1) without dropping off. As a result, the valve cap (4) can be kept securely on the valve seat (1). Further, the valve cap (4) is screwed to the valve seat tightly or released as such the hooks (42) are adapted to the apertures (191) in right or left alignment. An airtight or air-bleed effect is generated between the diaphragm (2) and the valve trough (12), more details are illustrated as shown in the sequent drawings.

Figure 11:
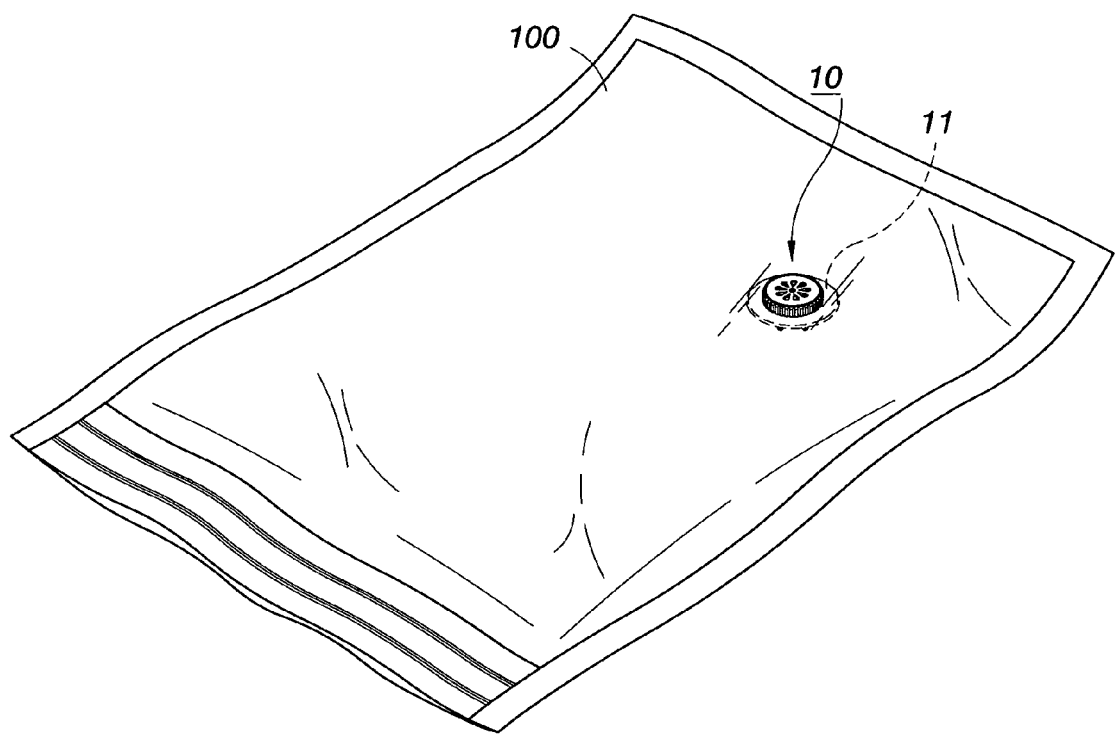
FIG. 11 is a diagram view of the one-way valve applied to the sealed bag.

Referring to FIG. 11, one-way valve (10) of the present invention is applied to the sealed bag (100), the sealed bag (100) can be used as a receiving bag preventing fluids or expelled air from flowing back.

Figure 12:
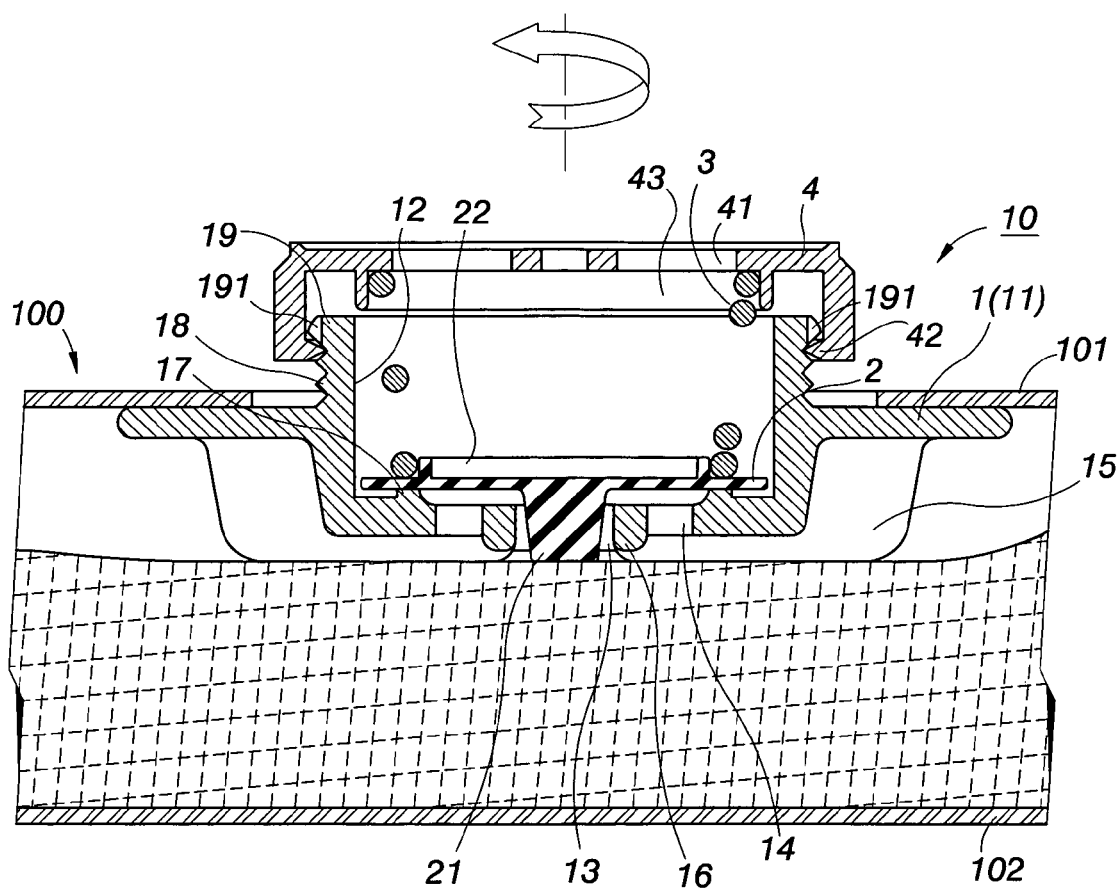
FIG. 12 is a cross sectional view after the one-way valve combined with the sealed bag.

Referring to FIG. 12, one-way valve (10) is combined to the sealed bag (100) by high frequency plastic welding. Such as the plate (11) of the valve seat (1) is welded to the bottom of an upper bag (101) of the sealed bag (100), after welding, only an upper portion of the outer threads (18) and the valve cap (4) screwed to the outer threads (18) exposed out from the sealed bag (100). The valve cap (4) is kept securely on the valve seat (1), even the valve cap (4) impacted or pressed by an outer force hardly drops off.

Further, referring to FIG. 12, an air-expelled process is performed through one-way valve, the valve cap (4) first has to release in reverse direction, the gap between the valve cap (4) and the diaphragm (2) is increased, the stop device (3) can be loosened to lower the pressure on the diaphragm (2). After completing the aforesaid steps, the air-expelled process can be started to expel air.

Figure 13:
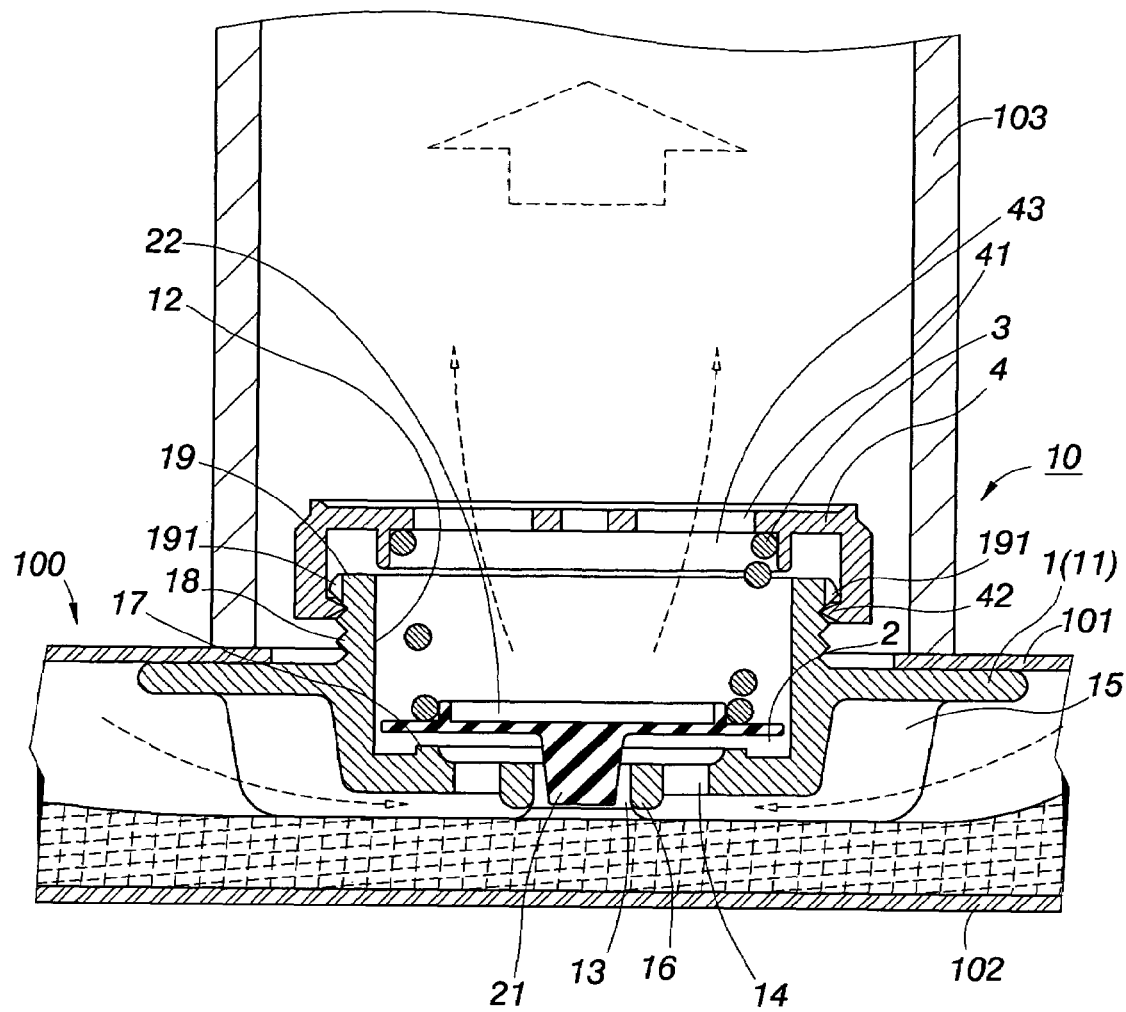
FIG. 13 is a cross sectional view of the first embodiment as the one-way valve expels the dead air from the bag.

Referring to FIG. 13, when air-expelled pipe (103) of an air-expelled device (not shown) fits over a circumference of valve cap (4), which is corresponding to the plate (11) underneath the upper bag (101) of the sealed bag (100), the air-expelled process can be performed. Dead air expelled out from the sealed bag (100) to reduce the air content until it approaches to a nearly vacuum condition. When air-expelled, the diaphragm (2) and the stop device (3) are afloat together above 2 mm, the diaphragm (2) is out of contact with the projected annular ring (17) on the base of valve trough (12), dead air is expelled from the bag through the air pores (14) of the valve trough (12) and the air pores 41 of the valve cap (4) to the air-expelled pipe (103) and then expel out of the bag, till the bag approaches to nearly vacuum. In the air-expelled process, the air deflectors (15) distributed in radial symmetry underneath the valve seat (1) and the projected annular ring (16) projected downward under the alignment hole (13) can be used to sweep away the lower bag, clothing, and quilts of the sealed bag (100) to clear the air pores (14) without intercepting by the same, the air-expelled process can be performed.

Figure 14:
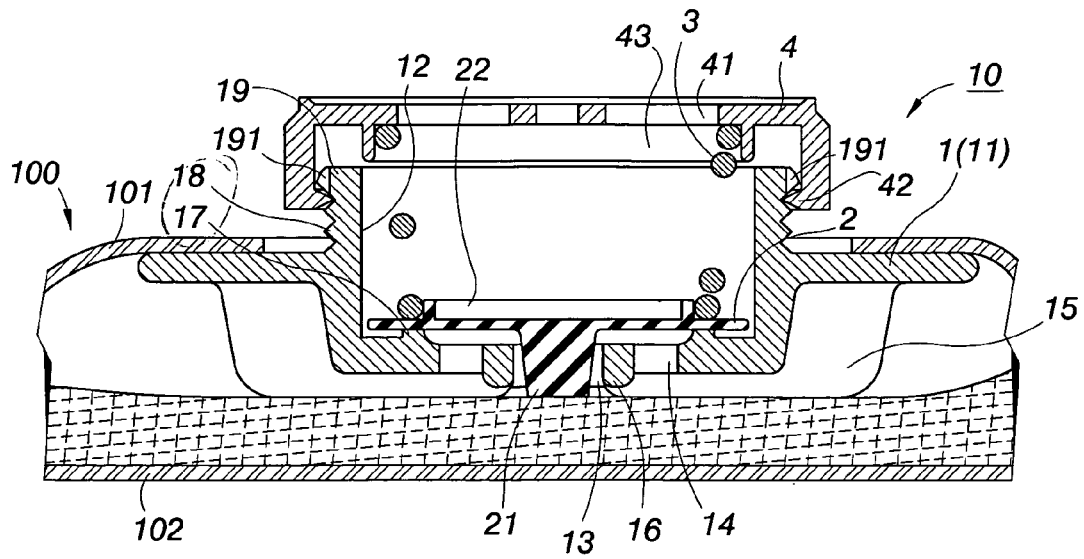
FIG. 14 is a cross sectional view of the first embodiment after the one-way valve expels the dead air from the bag.

Referring to FIG. 14, when air-expelled process is performed, the air-expelled pipe (101) can be removed from the valve cap (4); meanwhile, the diaphragm (2) promptly sticks to the projected annular ring (17) with one-way no-return check mechanism. Because the dead air is expelled out, a reduced air pressure retained in the sealed bag (100) relative to the normal atmospheric pressure in the surrounding environment, the diaphragm (2) is "absorbed" to the projected annular ring (17). In other words, when air-expelled process is completed, the diaphragm (2) can be restored to the original condition so as to stick to the projected annular ring (17). Even the reduced air pressure in the sealed bag (100) is inducing surrounding air automatically which is hardly flowed into the sealed bag (100).

Figure 15:
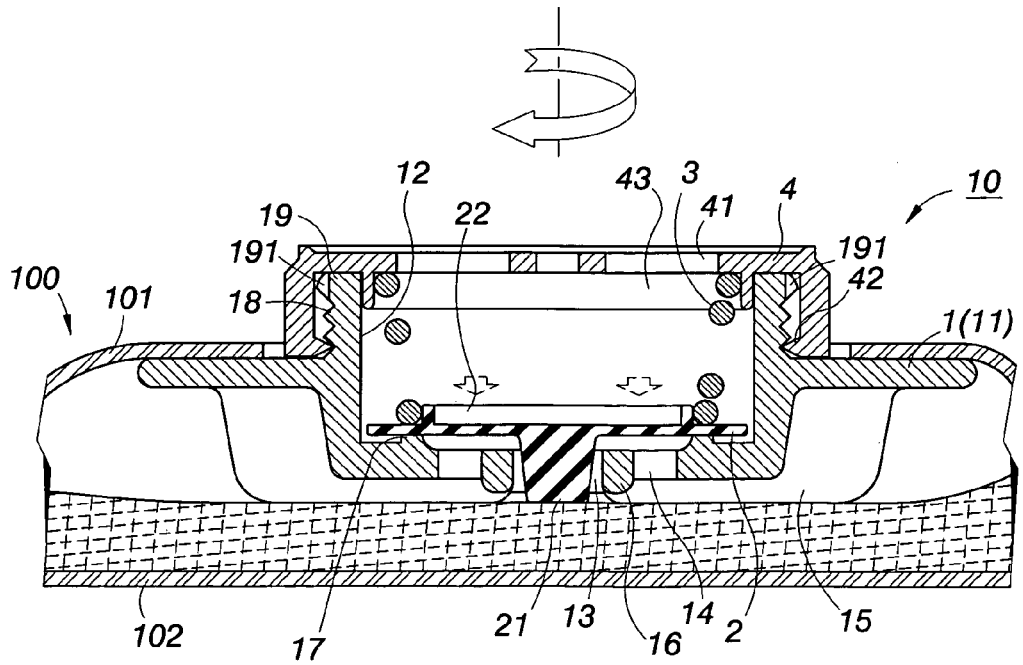
FIG. 15 is a cross sectional view of the first embodiment after the valve cap screwed to the valve seat.

Referring to FIG. 15, after completing the steps mentioned above, the user can screw the valve cap on the valve seat downward tightly to reduce the gap between the valve cap (4) and the diaphragm (2). Because the stop device (3) is substantially a spring, which is compressed between the valve cap (3) and the diaphragm (2), the spring is to restore the original condition, so as to increase an elastic force of the spring, namely, the stop device (3). Rather, a greater pressure is exerted to the diaphragm (2) so as to achieve a preferred airtight effect between the diaphragm (2) and the projected annular ring (17) to prevent the expelled air from flowing back.

Second Embodiment

Figures 16, 17:
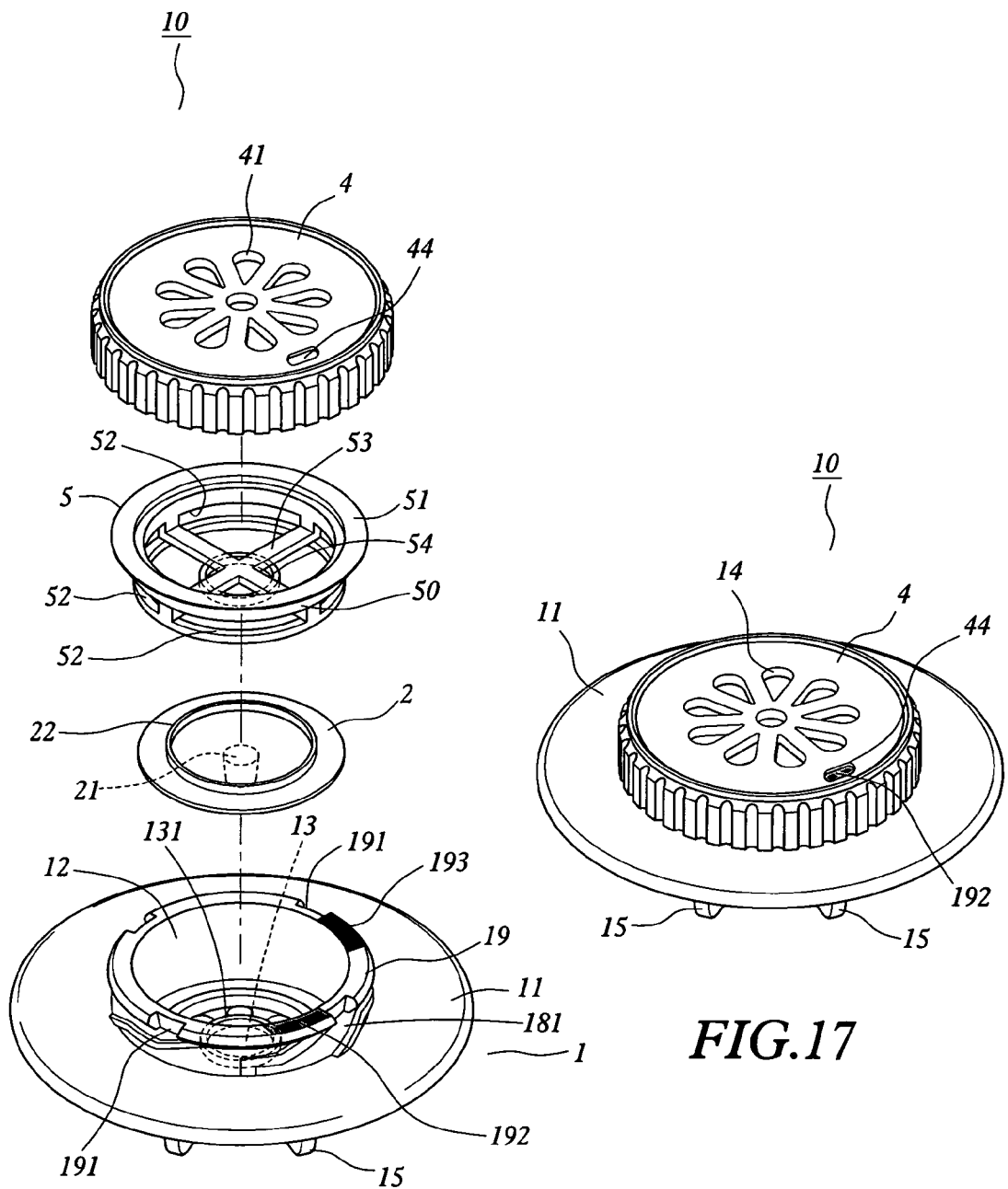
FIG. 16 is an exploded perspective view of the second embodiment of the present invention.
FIG. 17 is an assembled view of the second embodiment of the present invention.

Referring to FIGS. 16 and 17, an exploded view and an assembled view of the second embodiment are illustrated. The second embodiment has a stop device (5) that is different from the first embodiment. The stop device (5) is made of a rigid, transparent, plastic compressed seat. Configuration structure of the stop device (5) is a truncated pipe (50) with an outer diameter smaller than the inner diameter of the valve trough (12). An annular lip (51) is extended radially outwardly from a top opening of the truncated pipe (50) to prop up the valve cap (4), a bottom end of the truncated pipe (50) props against the diaphragm (2). A projected annular ring (22) formed on a top of the diaphragm (2) is led into the bottom opening of the stop device (5) in position (Please refer to FIG. 18), an enhanced rib (53) in the shape of cross is formed inside the bottom opening of the stop device (5). A plurality of hollowed out troughs (52) formed around a circumference of the truncated pipe (50).

Figure 18:
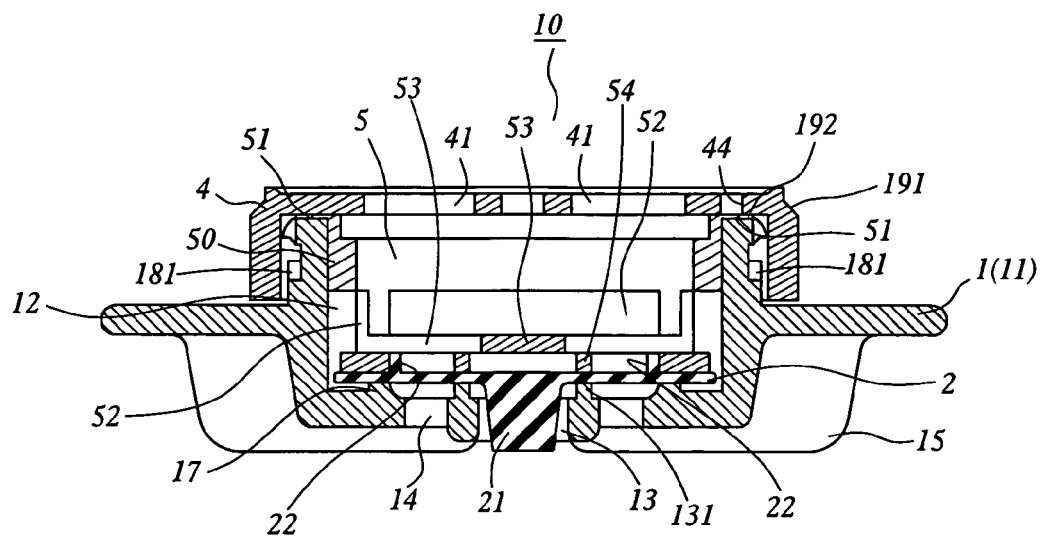
FIG. 18 is a cross section view of the second embodiment of the present invention.

Referring to FIG. 18, after combination of one-way valve, the lip (51) of the transparent stop device (5) is sandwiched between the through holes (44) and the stop ring (19); meanwhile, a bottom end of the stop device (5) props against the diaphragm (2), and the diaphragm 2 sticks to the projected annular ring (17). So the one-way valve (10) is under "closed" condition, neither air-expelled nor air-filled process is performed.

Figure 19:
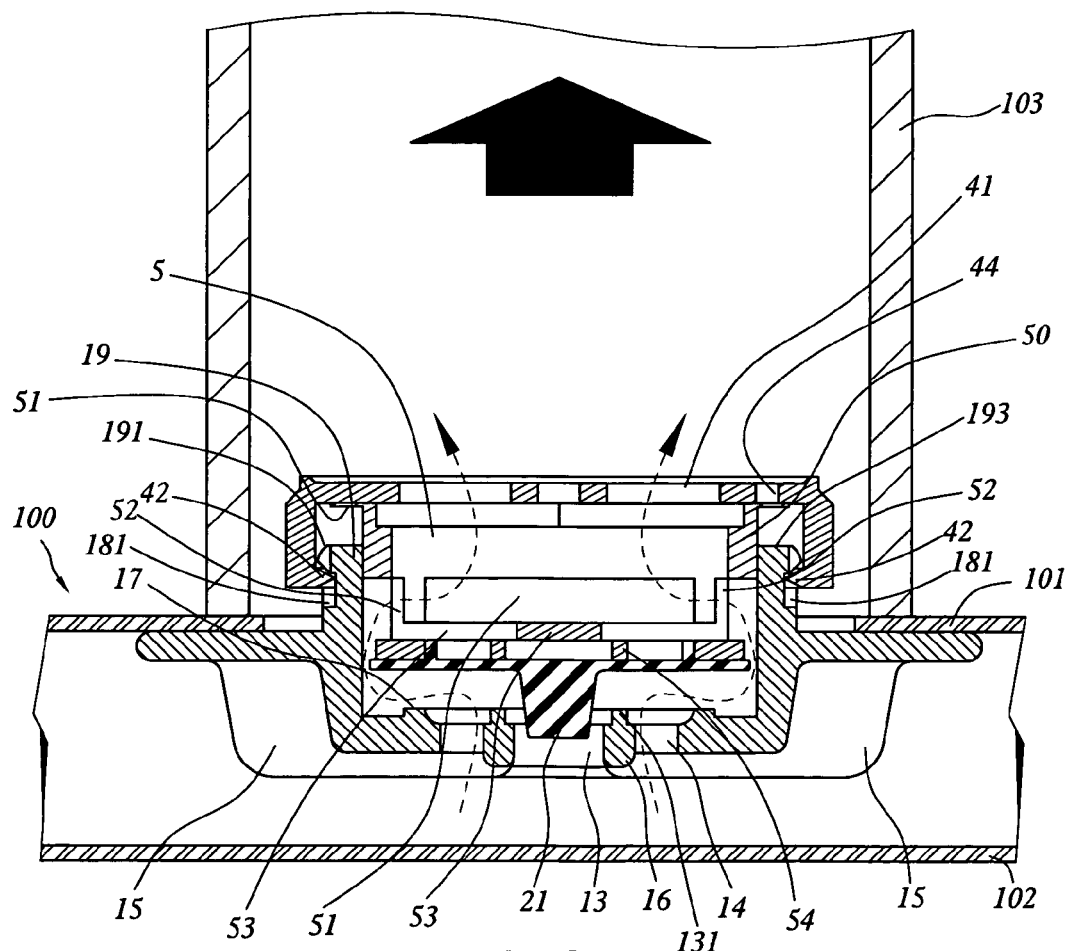
FIG. 19 is a schematic view of the second embodiment as the one-way valve expels the dead air from the bag.

Referring to FIG. 19, when releasing the valve cap (4) to proceed the air-expelled process, the diaphragm (2) and the stop device (5) are afloat together above 2 mm, the diaphragm (2) is out of contact with the projected annular ring (17) on the base of the valve trough (12). The dead air in the sealed bag is expelled out through the air pores (14) of the valve trough (12). And the dead air is circulated or flowed out through the hollowed out troughs (52) of the stop device (5) and the air pores (41) of the valve cap (4) and then the dead air is expelled out by air-expelled pipe (103) until it approaches to nearly vacuum in the sealed bag. Further, after releasing the aforesaid valve cap (4) to move upward to the valve seat (1). Though a bigger gap is generated between the valve cap (4) and the stop ring (19) of the valve seat (1), but the truncated pipe (50) and the lip (51) of the stop device (5) can be applied to seal the bigger gap. When air-expelled pipe (103) is applied to expel the dead air out of the sealed bag (100), the dead air passes through one-way valve (10) be expelled out, but the air led into the valve cap (4) by through holes (44) is insulated from either expelled out air flow of the air-expelled process or the air-filled process.

Besides, referring to FIG. 16, two different colored signs (192, 193) marked on a top of the stop ring (19) of the valve seat (1), such as the sign (192) is colored as green, sign (193) red, a fixed angle (for example, 90 degrees) is kept between the signs (192) and (193), this is also the maximum angle to rotate the valve cap (4) on the valve seat (1). Further, match up to said two signs (192, 193), an extra through hole (44) is formed on the top of the valve cap (4). After combination of the one-way valve (10) (Please referring to FIG. 17), only the transparent lip (51) (Please referring to FIG. 18) is sandwiched between the through holes (44) and the top of the stop ring (19). Because the lip (51) is transparent, the user sees through the through hole (44) for knowing the color of signs (192) or (193). Rather, the user can choose whether the valve cap (4) is further needed to tighten or loosen to some extent as the color of signs is shown. For example, when the green sign (192) is shown in the through hole (44), it says the one-way valve (10) is closed (i.e. the valve cap is screwed tightly, neither air-expelled nor air-filled process is performed). When the red sign (193) is shown in the through hole (44), it says the one-way valve (10) is open (i.e. the valve cap is screwed loose, air-expelled or air-filled process is to proceed). So the close or open status of the one-way valve (10) is known at the first sight of the user.

The invention claimed is:

1. One-way valve of a sealed bag comprising: a valve seat (1) having a valve trough (12) with an opening at a first end, a plate (11) extends radially outwardly from the valve trough (12) combined to the sealed bag, a base formed at a second end has a central alignment hole (13), which is surrounded by a first plurality of air pores (14), further the first plurality of air pores are circumscribed by a projected annular ring (17), outer threads (18) formed around a circumference surface of the valve trough (12) above the plate (11), a stop ring (19) on top of the outer threads (18) has an outer diameter larger than the outer threads (18) with several apertures (191) formed equidistantly along a circumference of the stop ring (19); a diaphragm (2), which is a flexible film mounted inside the valve trough (12) with a bolt (21) embedded into the central alignment hole (13) of the base of valve trough; a stop device (5) having a first end props up a valve cap (4), a second end resists against the diaphragm (2), the stop device (5) is further corresponding to the projected annular ring (17) of the base of the valve trough (12); the stop device (5) is a transparent compressed seat having a truncated pipe (50), an outer diameter of the pipe is smaller than an inner diameter of the valve trough (12), an annular lip (51) is extended radially outwardly along a rim of a top opening of the pipe (50), a crossed and enforced rib (53) formed inside a bottom opening, a plurality of hollowed troughs (52) are arranged around a circumference of the truncated pipe (50); the valve cap (4) screwed to the outer thread (18) of the valve seat (1), a second plurality of air pores (41) formed through a top of the valve cap (4), several hooks (42) radially inwardly formed along a bottom rim of the valve cap (4), the hooks (42) are corresponding to and glided into the apertures (191) of the stop ring (19), and then screwed to the outer threads (18) of the valve seat (1); two different colored signs (192, 193) marked on a top of the stop ring (19) of the valve seat (1), a top of the valve cap (4) has a through hole (44) corresponding to the different two signs (192,193).

2. One-way valve as claim 1 claimed wherein a valve trough (12) of the valve seat (1) and the plate (11) has an underside with a plurality of air deflectors (15) formed around the alignment hole (13) distributed in radial symmetry.

3. One-way valve as claim 2 claimed wherein a projected annular ring (16) is formed below the alignment hole (13) connected to the air deflectors (15), the height of the annular ring (16) is lower than the air deflectors (15).

4. One-way valve as claim 1 claimed wherein a projected annular ring (22) is formed on top of the diaphragm (2) in an annular form for the stop device (5) to fit over.

5. One-way valve as claim 1 claimed wherein a projected annular ring (43) formed underneath the cap (4) for the stop device (5) to fit over.

6. One-way valve as claim 1 claimed wherein the hooks (42) have inner threads formed radially inwardly, the inner threads can be applied to screw to the outer threads (18) of the valve trough (12), a radial depth of the inner threads is deeper than the depth of the apertures (191).

\* \* \* \* \*